United States Patent
Darbinyan et al.

(10) Patent No.: US 12,469,527 B2
(45) Date of Patent: Nov. 11, 2025

(54) IN SITU DELAY MEASUREMENTS ON INTEGRATED CIRCUITS USING LIVE DATA AND PULSE WIDTH MODULATION

(71) Applicant: Synopsys, Inc., Sunnyvale, CA (US)

(72) Inventors: Karen Darbinyan, Pleasanton, CA (US); Yervant Zorian, Santa Clara, CA (US); Grigor Khachatryan, Yerevan (AM); Karen Melkonyan, Ararat (AM)

(73) Assignee: Synopsys, Inc., Sunnyvale, CA (US)

( * ) Notice: Subject to any disclaimer, the term of this patent is extended or adjusted under 35 U.S.C. 154(b) by 180 days.

(21) Appl. No.: 18/462,380

(22) Filed: Sep. 6, 2023

(65) Prior Publication Data
US 2025/0078882 A1  Mar. 6, 2025

(51) Int. Cl.
*G11C 7/10* (2006.01)
*G11C 7/22* (2006.01)
*H03K 5/15* (2006.01)

(52) U.S. Cl.
CPC ............ *G11C 7/1066* (2013.01); *G11C 7/222* (2013.01); *H03K 5/15* (2013.01)

(58) Field of Classification Search
CPC ................................ G11C 7/10; G11C 7/1066
USPC ....................................................... 365/233.1
See application file for complete search history.

(56) References Cited

U.S. PATENT DOCUMENTS

| | | | | |
|---|---|---|---|---|
| 4,379,265 A * | 4/1983 | Catiller | ..................... | H03K 5/15 327/295 |
| 8,887,120 B1 * | 11/2014 | Verma | ...................... | H03K 5/06 326/29 |
| 8,890,575 B1 * | 11/2014 | Jang | ..................... | G01R 19/175 365/233.5 |
| 9,541,591 B2 | 1/2017 | Darbinyan et al. | | |
| 2021/0335199 A1 * | 10/2021 | Yuan | ..................... | G09G 3/2092 |
| 2022/0223085 A1 * | 7/2022 | Chang | ..................... | G09G 3/20 |

OTHER PUBLICATIONS

PCT International Search Report and Written Opinion, PCT Application No. PCT/US2024/045063, Feb. 25, 2025, 20 pages.
PCT Invitation to Pay Additional Fees with Partial Search Report and Provisional Opinion, PCT Application No. PCT/US2024/045063, Jan. 3, 2025, 17 pages.

* cited by examiner

*Primary Examiner* — Muna A Techane
(74) *Attorney, Agent, or Firm* — Fenwick & West LLP

(57) ABSTRACT

An integrated circuit includes delay monitors that monitor the delays of data signals from the digital circuitry by generating pulses having widths determined by the delays. In some embodiments, the delay monitor is implemented as a digital circuit that includes a pulse generator and an event generator. The delay monitor receives a data signal and a clock signal used to clock the data signal. The pulse generator generates pulses from the received data and clock signals, where the widths of the pulses are determined by a delay of the data signal relative to the clock signal. The event generator generates events that are distributed in time relative to the clock signal. As a result, the delay is estimable based on an overlap between the events and the pulses.

18 Claims, 9 Drawing Sheets

IN SITU DELAY MEASUREMENTS ON INTEGRATED CIRCUITS USING LIVE DATA AND PULSE WIDTH MODULATION

TECHNICAL FIELD

The present disclosure generally relates to delay measurements for an electronic circuit. In particular, the present disclosure relates to in-situ monitoring of delays in electronic circuits.

BACKGROUND

As technology nodes shrink and the complexity and gate count of devices increase, it becomes increasingly important to monitor the performance of integrated circuits over their lifetime. The increasing number of critical applications, such as automotive electronics and health monitoring devices, also makes failure avoidance and prediction an increasingly important requirement for these devices.

SUMMARY

In some aspects, an integrated circuit contains digital circuitry. The integrated circuit also includes delay monitors that monitor the delays of data signals from the digital circuitry by generating pulses having widths determined by the delays.

For example, a delay monitor may be implemented as a digital circuit that includes a pulse generator and an event generator. The delay monitor receives a data signal and a clock signal used to clock the data signal. The pulse generator generates pulses from the received data and clock signals, where the widths of the pulses are determined by a delay of the data signal relative to the clock signal. The event generator generates events that are distributed in time relative to the clock signal. As a result, the delay is estimable based on an overlap between the events and the pulses.

In alternate embodiments, monitors may monitor other properties of the digital circuitry by generating pulses having widths that are a function of the monitored properties.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
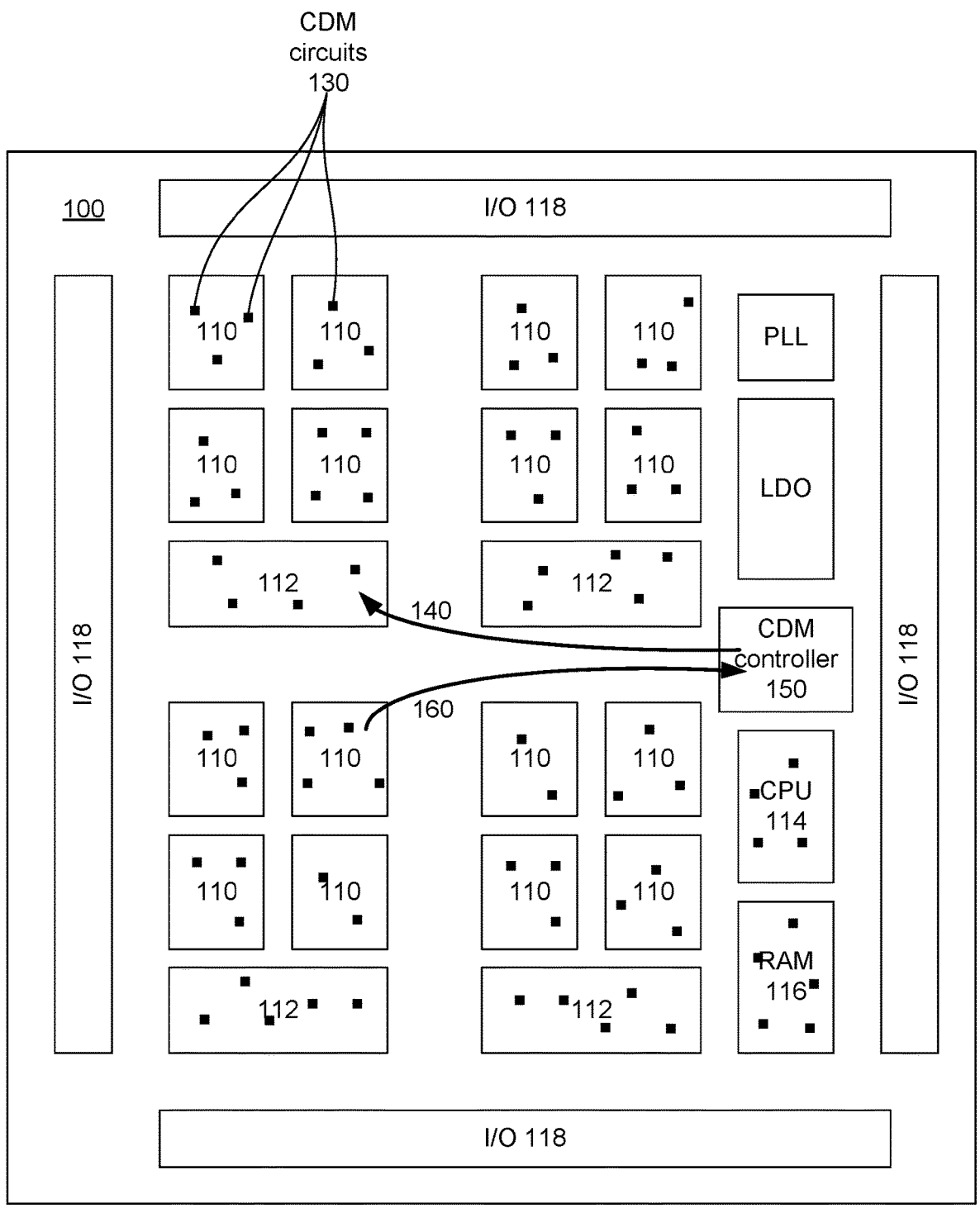
FIG. 1 is a block diagram of an integrated circuit with a built-in delay monitoring system, in accordance with some embodiments of the present disclosure.

Aspects of the present disclosure relate to in situ delay measurements on integrated circuits using live data and pulse width modulation. Monitoring of integrated circuits over their lifetime is becoming increasingly important. Delays of signals is an important parameter to monitor. One type of delay is memory access delay, which is the delay in reading data from an embedded memory in the integrated circuit. Another type of delay is propagation delay, which is the delay of a signal propagating through a logic path in the integrated circuit.

These and other delays can change over time and as a result of changing conditions. Changing temperature and voltage can affect delay times. Transistor aging can also affect delay times. Longer delays can lead to device errors. Monitoring delays across different conditions and over time can be used to predict future failures before they occur, as part of the overall life cycle management for the device.

However, there are challenges to monitoring delays. As devices operate at higher speeds using ever faster clocks, the delays will decrease, which means that delay monitors must be more sensitive. For current devices, it is useful for delay monitors to be able to estimate delays with an accuracy on the order of picoseconds (ps). Another challenge is that as devices become larger and more complex, more delay monitors are likely to be added. As a result, the delay monitors themselves should not occupy too much area. It is also beneficial to be able to estimate delays for live data produced by the circuit during its intended operation. This is sometimes referred to as mission mode, as opposed to test mode or calibration mode. Delay monitoring during mission mode is efficient because the device is still operating for its intended purpose while being monitored. It may also be more accurate because the conditions during monitoring are the actual mission mode conditions, whereas the conditions for other modes may be different.

In some aspects, delay monitors may monitor signal delays using pulse width modulation. The delay monitor receives a data signal and the clock signal used to clock the data signal. It generates pulses based on the two signals, where the width of the pulse is determined by the delay of the data signal relative to the clock signal. The data signal may be live data produced during mission mode of the integrated circuit. The pulses are generated whenever the live data changes value. The width of the pulses may be measured by sampling them asynchronously. Events are generated distributed in time relative to the clock signal. These are used to sample the pulses. The fraction of events that overlap with pulses can be used to estimate the width of the pulses and then the delay.

Technical advantages of the present disclosure include, but are not limited to, the following. The statistical sampling to determine pulse width can produce more accurate estimates compared to, for example, approaches using delay lines. The delay monitors described above can also be implemented using digital circuits constructed from standard cells. As such, they may be included in the integrated circuit design at the register transfer level (RTL) level, rather than requiring analog or custom designs. The ability to use mission mode data is also beneficial because it presents a more accurate picture of the device operation and it does not disrupt operation of the device.

FIG. 1 is a block diagram of an integrated circuit with a built-in delay monitoring system, in accordance with some embodiments of the present disclosure. In this particular example, the integrated circuit 100 is partitioned into four sectors, each with four processor cores 110 and associated logic and embedded memory 112. The integrated circuit also includes a central processing unit (CPU) 114, on-chip memory 116, and input/output (I/O) functions 118 such as serializer/deserializer (Serdes), Peripheral Component Interconnect Express (PCIe), High-Definition Multimedia Interface (HDMI), and double data rate (DDR).

The delay monitoring system includes instances of clock-to-data delay monitor (CDM) circuits, shown as black squares some of which are labelled 130, and a CDM controller 150. The CDMs 130 are distributed throughout the integrated circuit in order to monitor delays at different points across the integrated circuit and for different signals. In FIG. 1, for convenience, CDMs 130 are not shown in every block.

The CDMs 130 are integrated with the signal paths being monitored. As a result, the integrated circuit may be monitored in real-time during normal operation. Normal operation is sometimes referred to as mission mode. That is, the CDMs do not require a special monitor mode, and mission mode need not be interrupted in order to take delay measurements.

The CDM controller 150 is also integrated on-chip. In FIG. 1, it is shown as one block but it may be implemented in a distributed fashion. The CDM controller 150 communicates with the CDMs 130. The controller 150 may send control signals 140 to the CDMs 130. Examples of control signals include signals for the CDMs to initiate and terminate measurements. Another example is a mode selection signal to put the CDM into different modes.

The CDM controller 150 also receives data from the CDMs. This includes the CDM signals 160, which are the output produced by the CDMs from their measurement of delays. The CDM signals 160 may include estimates of delays, or they may include precursor data (such as counts c1 and c2 below) which are then processed to estimate delays. The controller 150 analyzes the CDM signals 160, thus providing a delay monitoring capability across the integrated circuit. For example, it may combine the data from the individual CDMs to provide a chip-level model of delay.

Because both the CDMs 130 and the CDM controller 150 are on-chip, the delay monitoring system may provide real-time in-situ monitoring of delays across the integrated circuit. The data produced by the monitoring system may be consumed on-chip. For example, estimated delays may be used as feedback to alter the operation of other circuitry on the chip.

The CDM data produced by the delay monitoring system may also be used to monitor changes in delay over the lifetime of the chip. Current delay data may be compared to historical data to identify trends and predict future problems. The delay data may also be analyzed off-chip. More complex analysis may require computational resources that are not available on-chip, and storage of delay data captured over long periods of time may require more space than is available on-chip. Analysis may also combine the delay data with other data that is not available on-chip, for example external measurements of temperature or power consumption. As another example, delay data from multiple chips may be analyzed together to provide a view of a board, a rack-mounted device or other environment that is larger than just a single chip.

Figure 2A:
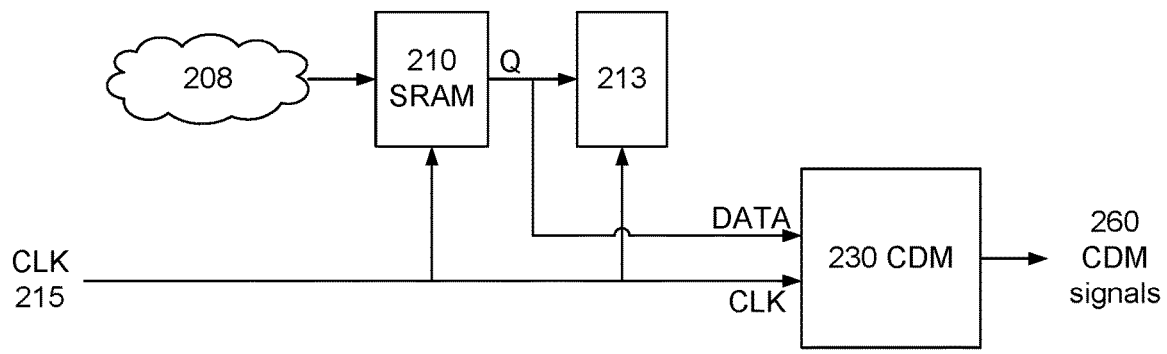
FIG. 2A is a block diagram of a clock-to-data delay monitor (CDM) monitoring data access delay for reading data from a memory, in accordance with some embodiments of the present disclosure.
Figure 2B:
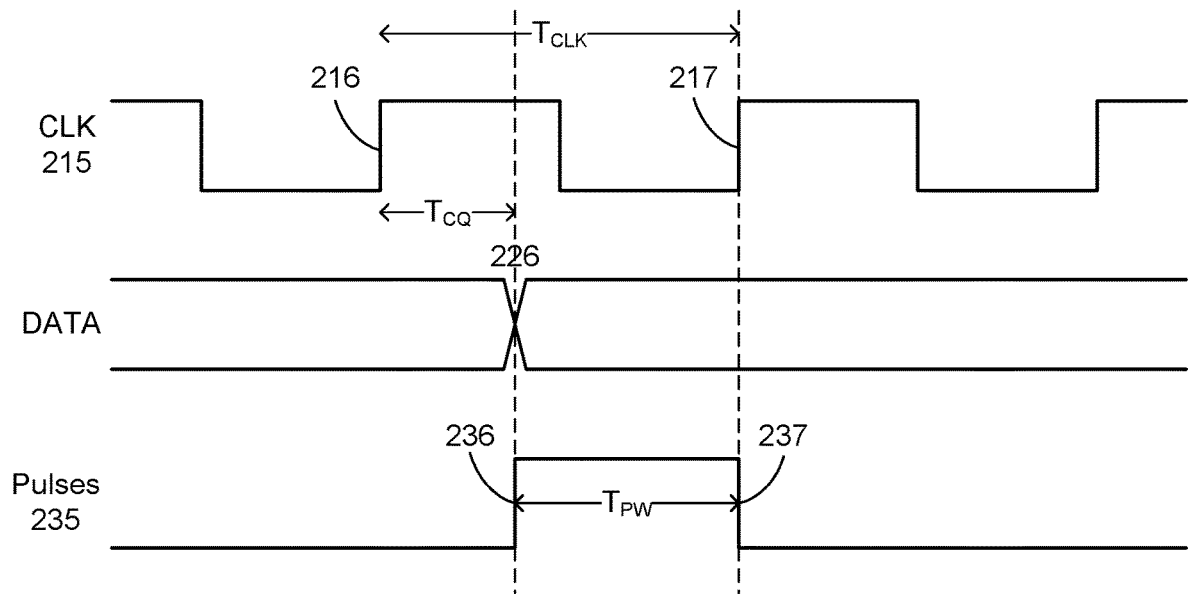
FIG. 2B is a timing diagram illustrating operation of the CDM of FIG. 2A.

FIG. 2A is a block diagram of a CDM monitoring data access delay for reading data from a memory, in accordance with some embodiments of the present disclosure. FIG. 2B is a timing diagram illustrating operation of the CDM of FIG. 2A. FIG. 2A shows an embedded memory 210 which stores data. Circuitry 208 controls memory 210 to read data from the memory. The data denoted as Q is read from a memory port into a sequential circuit 213, such as a flip-flop. The read operation is clocked by a clock signal 215.

The CDM 230 monitors the delay in reading data Q from the memory 210. This delay is the data access delay $T_{CQ}$, where the subscripts C and Q stand for the clock CLK and the data Q. FIG. 2B shows the clock signal CLK with period $T_{CLK}$. The data read is triggered by leading edge 216 of the clock, but the data Q is not available until some later time 226. The delay between the triggering edge 216 and the availability 226 of data Q is the data access delay $T_{CQ}$.

The CDM 230 operates to generate pulses 235 that have widths that are a function of $T_{CQ}$. In this example, pulses 235 are generated when the data Q toggles values. The CDM 230 receives both the clock signal CLK and the data signal Q. The leading edge 236 of pulse 235 is triggered by toggling of the data Q, which happens at time 226. The trailing edge 237 of pulse 235 is triggered by the next leading edge 217 of the clock CLK. The pulse width $T_{PW}$ is then a measure of the data access delay $T_{CQ}$. Specifically, $$T_{CQ} = T_{CLK} - T_{PW} \quad (1A)$$

Figure 4:
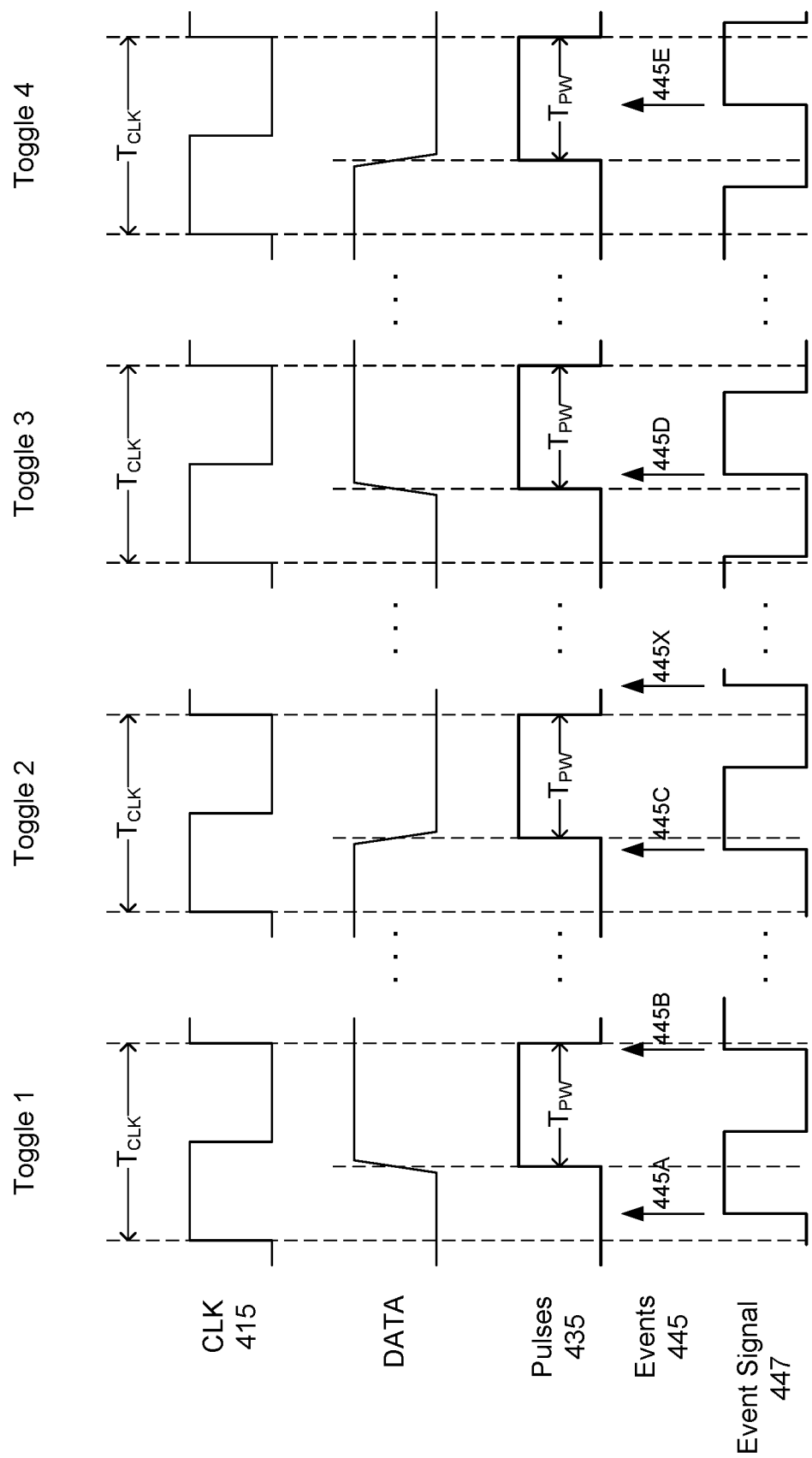
FIG. 4 is a timing diagram illustrating statistical sampling of the pulse width, in accordance with some embodiments of the present disclosure.

The signals 260 output from the CDM are indicative of the pulse width. They may be an estimate of the pulse width. Alternatively, they may be data from which the pulse width or data access delay may be calculated. In the example of FIG. 4, the pulse width is proportional to a ratio (c1/c2) of two counts. The CDM 230 may output the two integers c1 and c2, and the CDM controller or other processor may estimate the delay from these counts.

Figure 3A:
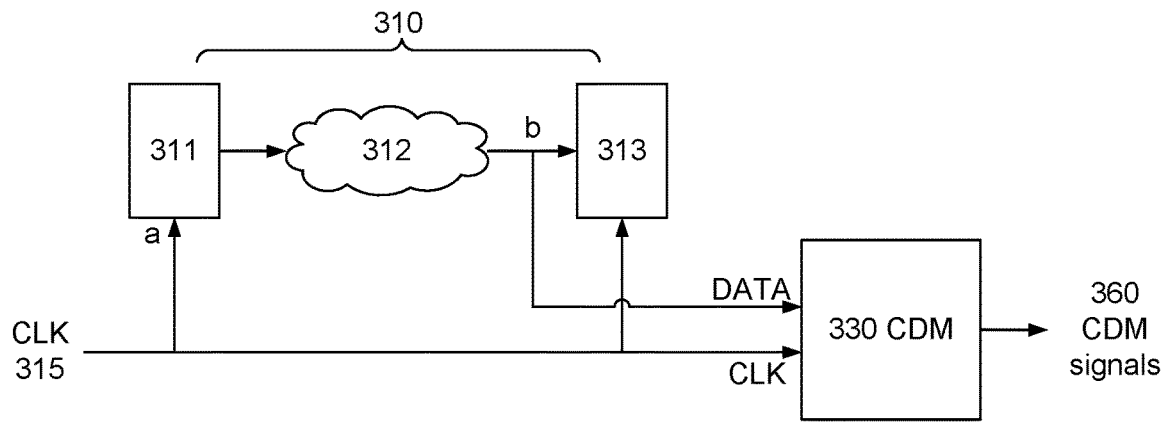
FIG. 3A is a block diagram of a CDM monitoring propagation delay of a signal propagating along a logic path, in accordance with some embodiments of the present disclosure.
Figure 3B:
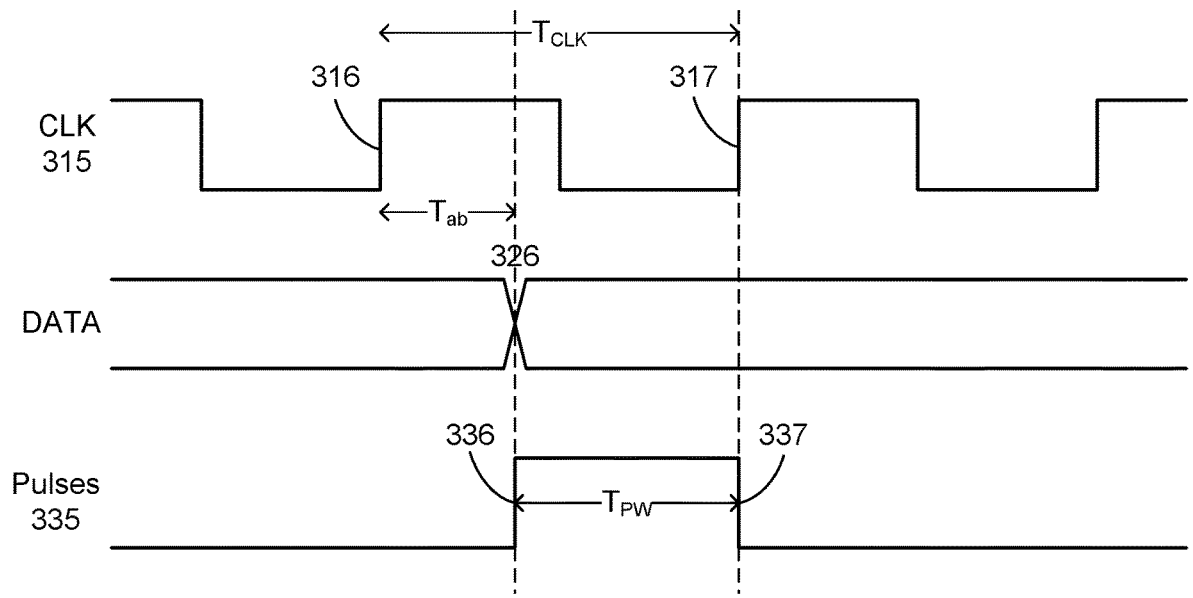
FIG. 3B is a timing diagram illustrating operation of the CDM of FIG. 3A.

FIG. 3A is a block diagram of a CDM monitoring propagation delay of a signal propagating along a logic path, in accordance with some embodiments of the present disclosure. FIG. 3B is a timing diagram illustrating operation of the CDM of FIG. 3A. In this example, logic path 310 originates at sequential circuit 311, propagates through combinational circuitry 312 and terminates at sequential circuit 313. Here, the sequential circuits 311, 313 are flip flops, and the originating flop 311 and terminal flop 313 are clocked by clock signal 315.

The CDM 330 monitors the propagation delay $T_{ab}$ for signals propagating through the combinational circuitry 312 arriving at the terminal flop 313. FIG. 3B shows the clock signal CLK with period $T_{CLK}$. Signal propagation is triggered by leading edge 316 of the clock, but the DATA is not available until some later time 326. The delay between the triggering edge 316 and the availability 326 of DATA is the propagation delay $T_{ab}$.

The CDM 330 operates similarly to CDM 230 in FIG. 2. The CDM 330 generates pulses 335 that have widths that are a function of the delay $T_{ab}$. In this example, pulses 335 are generated when the DATA toggles values. The CDM 330 receives both the clock signal CLK and the data signal DATA. The leading edge 336 of pulse 335 is triggered by toggling of DATA, which happens at time 326. The trailing edge 337 of pulse 335 is triggered by the next leading edge 317 of the clock CLK, assuming that the propagation delay is less than one clock cycle. The pulse width $T_{PW}$ is then a measure of the propagation delay $T_{ab}$, with $$T_{ab} = T_{CLK} - T_{PW} \quad (1B)$$

This is the same as Eqn. 1A but substituting propagation delay $T_{ab}$ for data access delay $T_{CQ}$. If the signal propagation takes more than one clock cycle, then $T_{CLK}$ in Eqn. 1B may be increased to the appropriate number of clock cycles. The signals 360 output from the CDM are indicative of the pulse width and may take any of the forms described above for CDM signals 260.

FIG. 4 is a timing diagram that illustrates statistical sampling of the pulse width, in accordance with some embodiments of the present disclosure. FIG. 4 shows four columns labelled Toggle 1-4. Each column is a different instance when DATA toggles its value. The leading edge of the clock cycle shown triggers the change in DATA value. Because the DATA is toggling its value, a corresponding pulse 435 is also generated. As described previously, the leading edge of the pulse 435 is triggered by the change in DATA value and the trailing edge of the pulse is triggered by the leading edge of the next clock cycle. Other clock periods which are not data triggers (e.g., no data retrieved from memory during that clock cycle) or which do not result in a change in DATA value (e.g., the retrieved data value is the same as the previously retrieved value) are not shown in FIG. 4.

The pulses 435 have a width $T_{PW}$ which is some fraction of the clock period $T_{CLK}$. This width is a measure of delay, and both the delay and the pulse width $T_{PW}$ may be considered to be constant for the time scales considered here. For purposes of illustration, the delay for a DATA transition from logic 0 to logic 1 is shown as the same as for a transition from logic 1 to logic 0. If that is not the case, the techniques described herein may be used to separately estimate delays for the two transitions. One way to estimate the pulse width $T_{PW}$ is to measure it directly, for example by using digital delay lines. However, this requires a significant amount of high performance circuitry to achieve good accuracy for high speed circuits.

Instead, in FIG. 4, the pulse width $T_{PW}$ is measured by statistical sampling. FIG. 4 shows events 445 which are distributed in time relative to the clock signal CLK. In this example, the events 445 are the rising edges of an event signal 447, which may be a clock that is asynchronous relative to CLK 415. Assume that the events 445 are evenly distributed across the clock period. Some events 445 overlap with pulses 435 and some do not. The percentage of events that overlap with pulses is a direct measure of the pulse width $T_{PW}$. If c1 is the count of events that overlap with pulses and c2 is the total count of events that fall within clock cycles 415 where DATA toggles, then the pulse width may be estimated by:

$$T_{PW} = (c1/c2) T_{CLK} \quad (1)$$

In the example of FIG. 4, count c1 includes events 445B, D,E. Count c2 additionally includes events 445A,C. Neither count includes 445X, because it does not fall within a clock period where DATA toggles.

The events do not have to be evenly distributed across a clock cycle. They may take some other distribution, or they may span less than the full clock cycle. If the delay is known to fall within some range, the events may be distributed across that range rather than across the entire clock period.

Figure 5A:
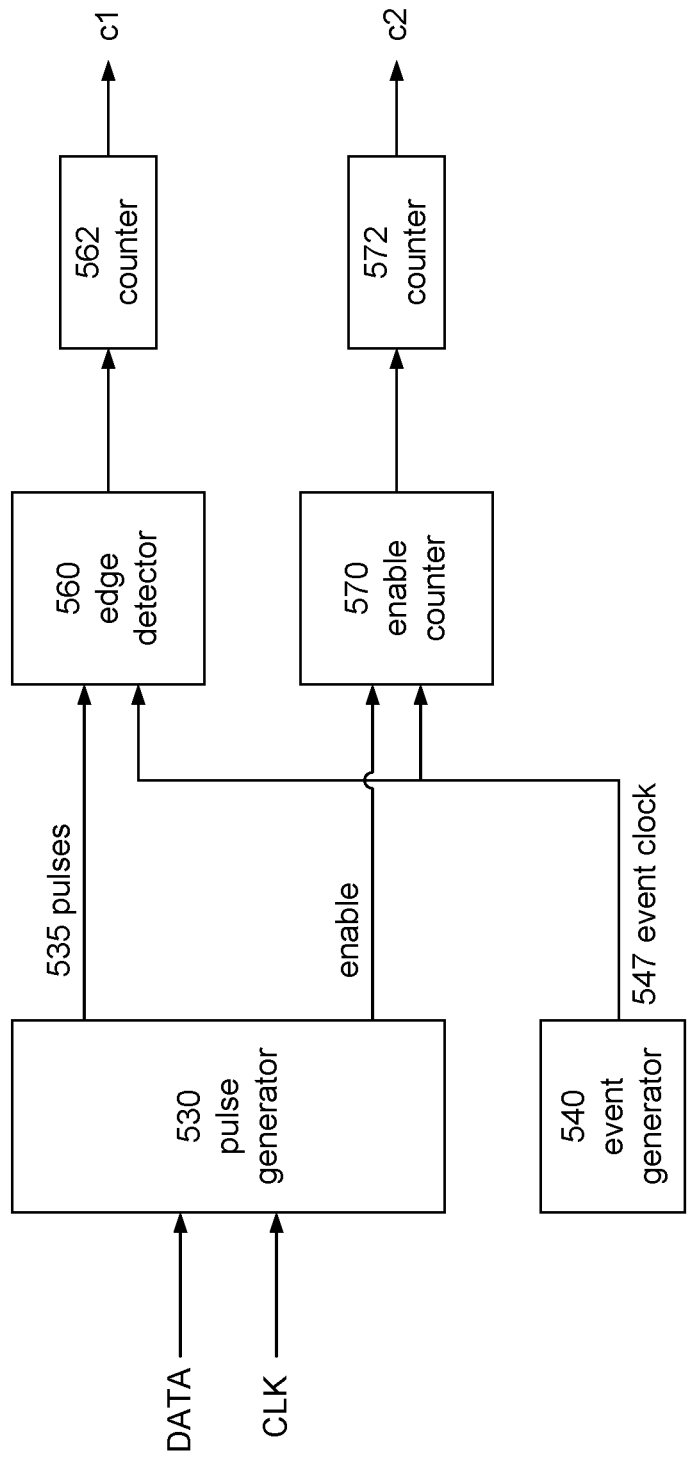
FIG. 5A is a block diagram of a CDM, in accordance with some embodiments of the present disclosure.
Figure 5B:
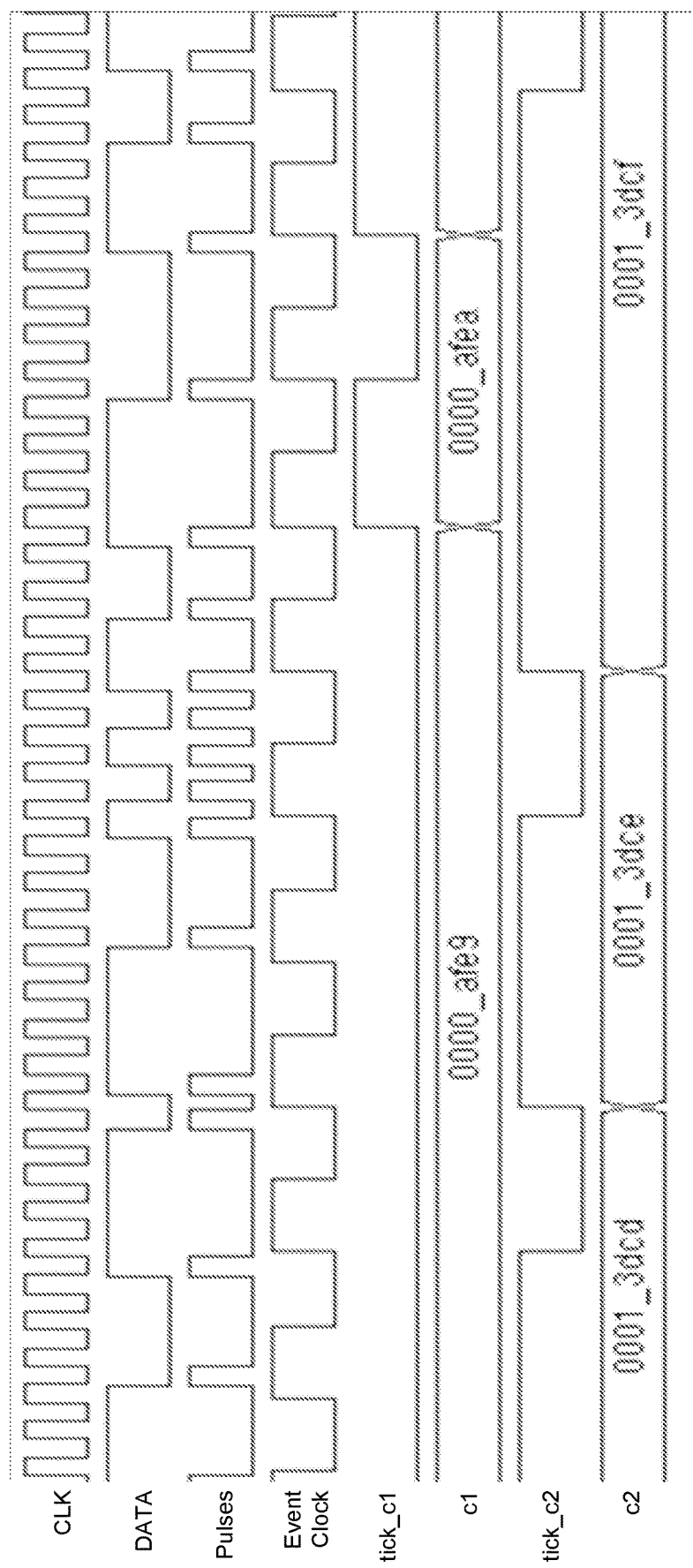
FIG. 5B is a timing diagram illustrating operation of the CDM of FIG. 5A.

FIG. 5A is a block diagram of a CDM, in accordance with some embodiments of the present disclosure. FIG. 5B is a timing diagram illustrating operation of the CDM of FIG. 5A. The CDM receives clock signal CLK and data signal DATA. It produces two counts c1 and c2. The ratio (c1/c2) is indicative of the delay between CLK and DATA. A pulse generator 530 receives the CLK and DATA and generates pulses 535 as described previously. It also produces enable pulses 537 which are high for clock periods in which DATA toggles. An event generator 540 generates events that are used to sample the pulse stream. The events are distributed in time relative to the clock signal, so that the sampling provides a measure of the pulse width of the pulses.

For example, the event generator 540 may be a random event generator, meaning that the events are generated with some randomness to the timing. If the delay falls within a known range, the events may be distributed across that range. The same distribution may be achieved by using non-random event generators. For example, the event generator may be a clock with a different frequency than the clock signal CLK, where the periods of the two clocks are not multiples of each other. Then the difference in timing between the events and CLK edges will change over time and the events may be evenly distributed across the range of delay. In this example, the event generator 540 is a clock with a different frequency than CLK, and the events are the rising edges of the Event Clock shown in FIG. 5B.

The top two rows of FIG. 5B show the incoming clock signal CLK and the incoming data signal DATA. The pulse generator 530 receives these signals and generates a stream of pulses 535, shown in the third row of FIG. 5B. The event generator 540 generates the event clock 547 shown in the fourth row of FIG. 5B, and the events are the rising edges of this clock signal.

The top row of FIG. 5A produces the count c1, which is the count of events that overlap with pulses. The edge detector 560 receives the pulses 535 and the events 547. The edge detector 560 and counter 562 then produce the count c1. In FIG. 5B, the signal tick_c1 toggles whenever the conditions for counting c1 are met. The following row c1 shows the actual value of c1, which increments on each rising edge of tick_c1.

The bottom row of FIG. 5A produces the count c2, which is the total count of events in clock periods where a pulse was generated (i.e., where data toggles). Note that events occurring in clock periods that do not generate a pulse are not counted. The enable counter 570 and counter 572 produce the count c2. In FIG. 5B, the signal tick_c2 are ticks for c2, and the following row c2 is the actual value of c2.

This statistical approach can provide greater accuracy. For integrated circuits that are fabricated using sub-micron technology nodes, embedded memory may have data access delays on the order of hundreds of ps. This approach can be used to estimate delays to an accuracy of 100 ps, or even 10 ps or better. Furthermore, because the approach is statistical in nature, it can be more tolerant against changing conditions. Changes in temperature, voltage or aging may affect other approaches, resulting in the use of calibration or other compensation techniques which may be avoided with this approach. The CDM circuit of FIG. 5 is also a fairly simple digital circuit. The circuit may be constructed from standard cells. It is not a very demanding circuit and does not occupy much area.

Figure 6:
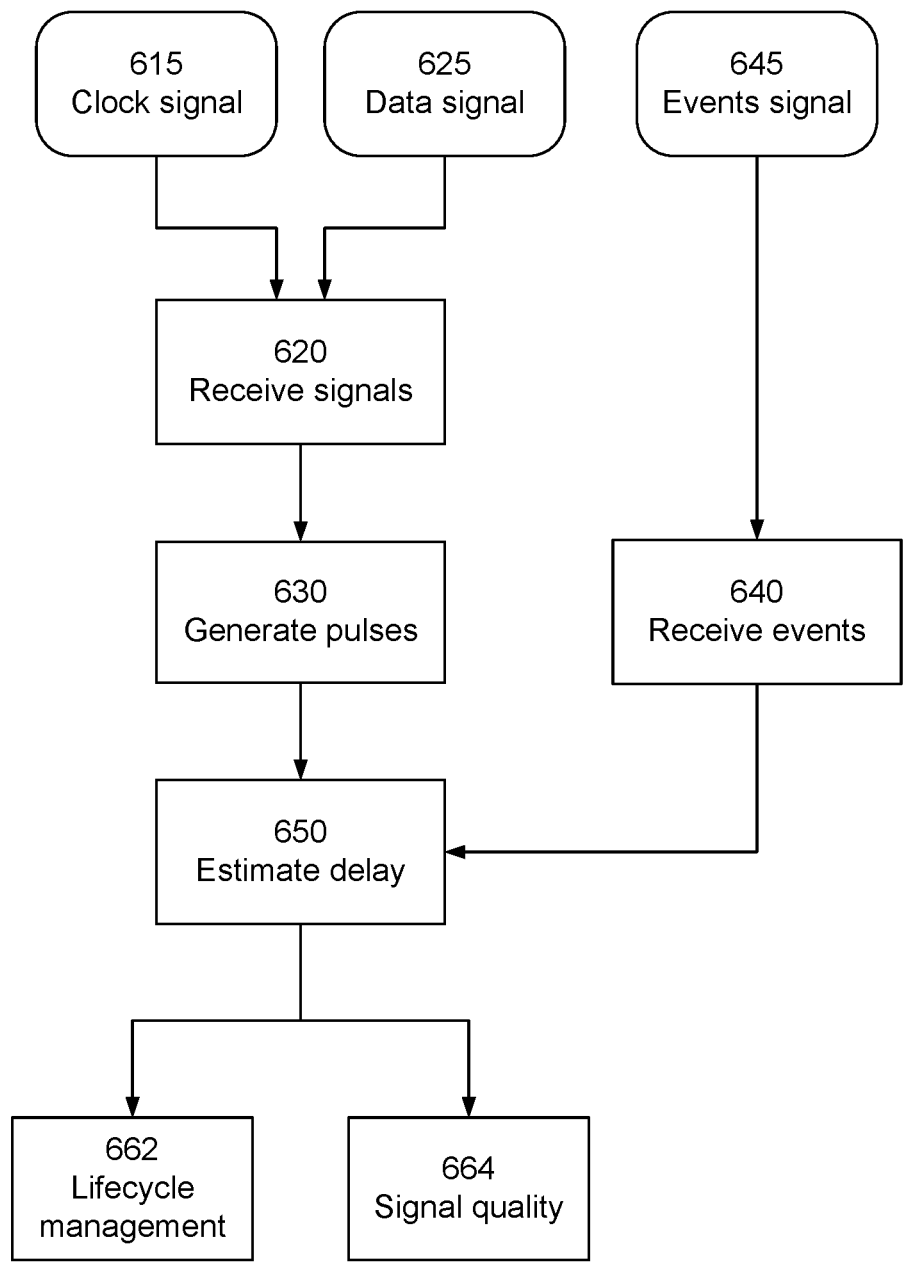
FIG. 6 is a flow diagram for monitoring delays in an integrated circuit, in accordance with some embodiments of the present disclosure.

FIG. 6 is a flow diagram for monitoring delays in an integrated circuit, in accordance with some embodiments of the present disclosure. At 620, a data signal 625 and corresponding clock signal 615 are received. At 630, pulses are generated from the received data signal and the received clock signal. The widths of the pulses are determined by a delay of the data signal relative to the clock signal. At 640, events 645 are received. The events are distributed in time relative to the clock signal. At 650, the delay of the data signal is estimated based on an overlap between the events and the pulses.

The delay estimates may be used for various purposes. At 662, they are used for lifecycle management. Predictive failure analysis may be performed based on the estimated delays over time. By observing changes in the delay over time, the trend and rate of change in delay may be estimated and used to predict the actual delay in the future. This may be used to predict when the actual delay approaches critical values. Appropriate warnings and alarms may be provided to avoid fatal errors of the system. In this way, problem areas on the device may be identified before they fail and appropriate actions taken. For example, the clock frequency may be reduced, or the voltage levels changed dynamically in response to the delay estimates.

At 664, this technique may be used to measure and monitor signal quality, such as the eye opening in data transmission. For data transmission, the CDM can be incorporated into PHY circuits to measure DDR, UCIe, HBM, PCIe, USB, MIPI, HDMI and other PHYs data to clock signal distance, in order to measure or evaluate the data transmission eye opening. One advantage of this approach compared to delay lines is that this approach works well for different clock frequencies whereas delay lines are specific to clock frequencies.

The statistical sampling approach may also be used to measure quantities other than delay, where the measured quantity is converted to pulse width modulation. Examples include temperature and voltage. Higher temperatures may be converted to wider pulses, or higher voltages may result in wider pulses. The pulse width may be measured as described above. It may also be used to measure the duty cycle of periodic signals.

Figure 7:
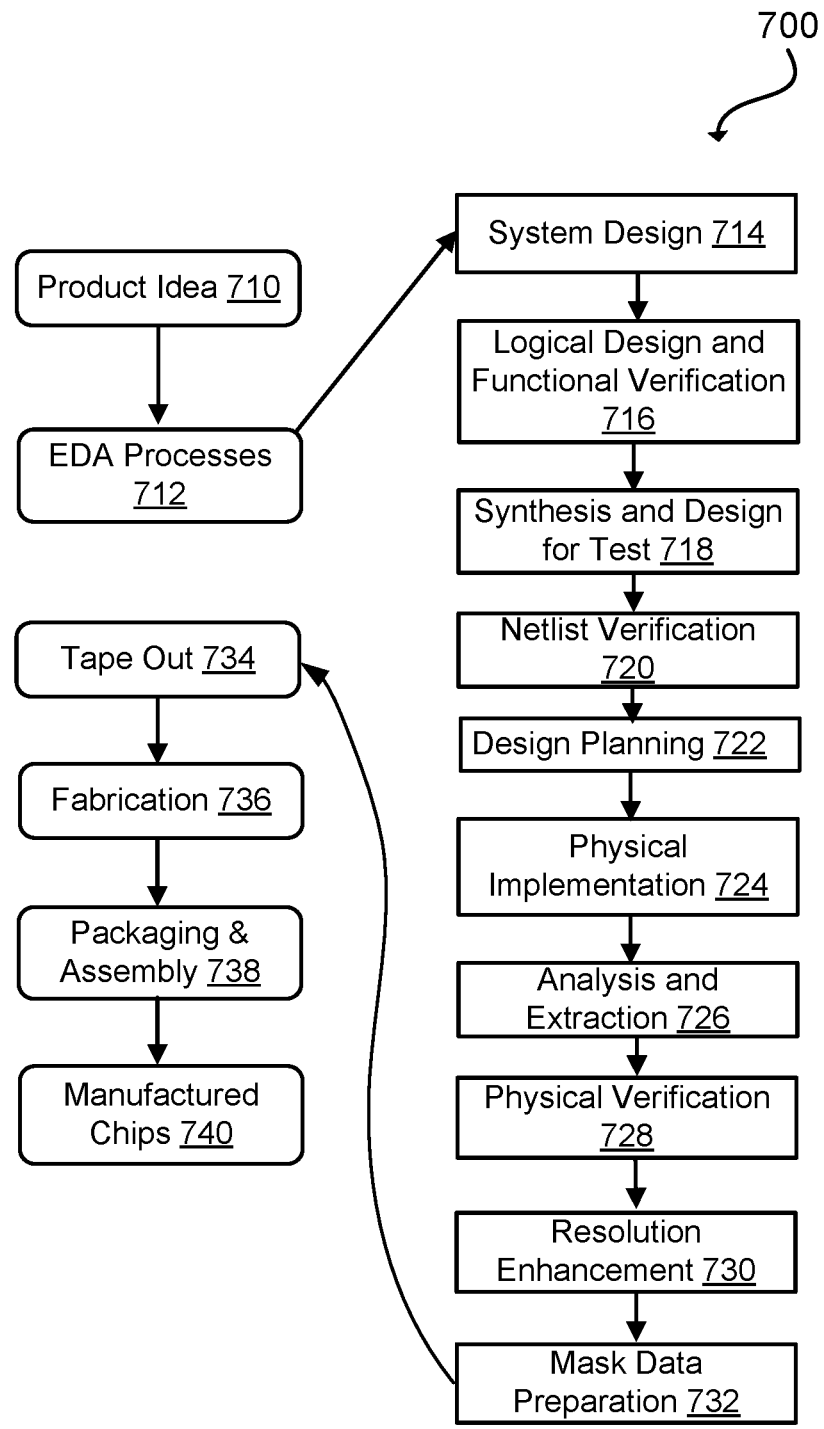
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
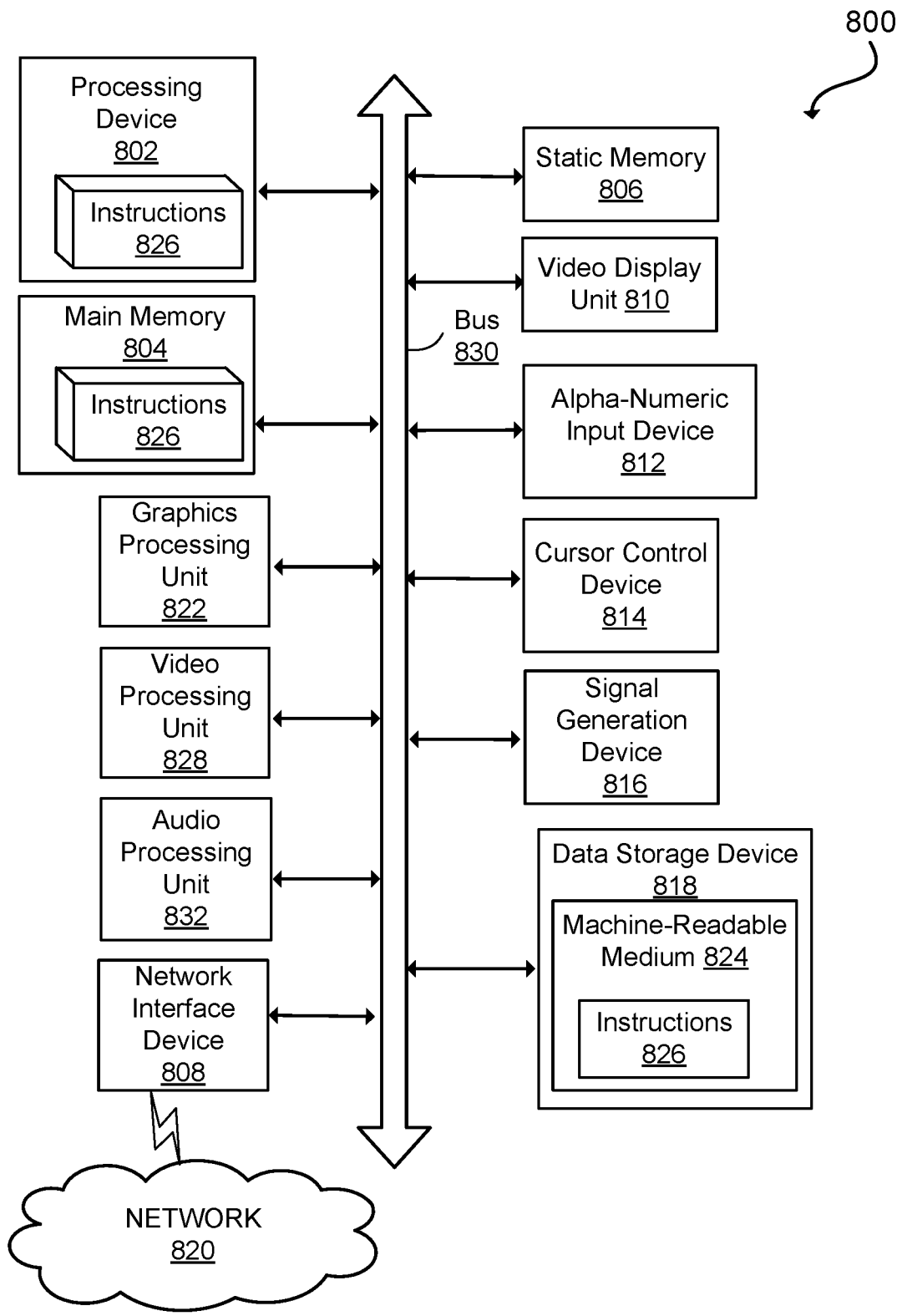
FIG. 8 depicts a diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. An integrated circuit comprising:
    digital circuitry; and
    a plurality of property monitors that monitor properties of the digital circuitry; wherein the plurality of property monitors generate pulses having widths that are a function of the properties, the property monitors are delay monitors that monitor delays of data signals from the digital circuitry, the delay monitors generate the pulses having the widths determined by the delays, and the delay monitors each comprise:
        a first counter that counts a number c1 of events that overlap with the pulses, wherein the events are distributed in time relative to a clock signal that clocks the data signal; and
        a second counter that counts a total number c2 of events, wherein the delay is estimable as a function of (c1/c2).

2. The integrated circuit of claim 1, wherein the digital circuitry comprises an embedded memory and, for at least one of the delay monitors, the data signal is a data value read from the embedded memory, and the delay is a data access delay for reading the data value from the embedded memory.

3. The integrated circuit of claim 1, wherein the digital circuitry comprises a logic path and, for at least one of the delay monitors, the data signal propagates through the logic path, and the delay is a propagation delay for the data signal propagating through the logic path.

4. The integrated circuit of claim 1, wherein the data signals are live data signals from a mission mode of the integrated circuit.

5. The integrated circuit of claim 1, wherein the integrated circuit is fabricated using a sub-micron technology node.

6. The integrated circuit of claim 1, wherein the property monitors are not calibrated for temperature, supply voltage, or aging.

7. The integrated circuit of claim 1, wherein the monitored properties include at least one of temperature, voltage and current.

8. A delay monitor digital circuit comprising:
    a first input that receives a data signal;
    a second input that receives a clock signal used to clock the data signal;
    a pulse generator coupled to the first and second inputs, wherein the pulse generator generates a plurality of pulses from the received data signal and the received clock signal, and widths of the pulses are determined by a delay of the data signal relative to the clock signal;
    an event generator that generates a plurality of events that are distributed in time relative to the clock signal, wherein the delay is estimable based on an overlap between the events and the pulses.

9. The delay monitor digital circuit of claim 8, wherein the pulse generator is configured to start a pulse when the data signal toggles, and end the pulse on a next rising edge of the clock signal.

10. The delay monitor digital circuit of claim 8, wherein the event generator is a random event generator that generates the events with random timing relative to the clock signal.

11. The delay monitor digital circuit of claim 8, wherein the event generator does not generate the events with random timing, but is asynchronous relative to the clock signal and generates the events distributed over a range of possible values for the delay.

12. The delay monitor digital circuit of claim 8, further comprising:
    a first counter that counts a number c1 of events that overlap with the pulses; and
    a second counter that counts a total number c2 of events, wherein the delay is estimable as a function of (c1/c2).

13. The delay monitor digital circuit of claim 8, wherein the delay monitor digital circuit is synthesized from an RTL description, and the delay monitor digital circuit is constructed from standard cells.

14. A method comprising:
    receiving a data signal, and a clock signal used to clock the data signal;
    generating a plurality of pulses from the received data signal and the received clock signal, wherein widths of the pulses are determined by a delay of the data signal relative to the clock signal;

receiving a plurality of events that are distributed in time relative to the clock signal; and estimating the delay based on overlap between the events and the pulses.

15. The method of claim 14, wherein generating the plurality of pulses comprises:

starting a pulse when the data signal toggles, wherein toggling of the data signal is clocked by a first cycle of the clock signal; and ending the pulse based on a next cycle of the clock signal.

16. The method of claim 14, wherein estimating the delay comprises:

counting a number c1 of events that overlap with the pulses;

counting a total number c2 of events; and estimating the delay based on a period of the clock signal times (c1/c2).

17. The method of claim 14 further comprising:

performing predictive failure analysis of a circuit, based on monitoring the estimated delay over time.

18. The method of claim 14 further comprising:

evaluating an eye opening of data transmission using the data signal, based on the estimated delay.

* * * * *